United States Patent Office 3,326,877
Patented June 20, 1967

3,326,877
CATALYSTS AND PROCESS FOR
POLYMERIZATION
Adam Orzechowski, Waltham, and James C. MacKenzie, Wellesley Hills, Mass., assignors to Cabot Corporation, Boston, Mass., a corporation of Delaware
No Drawing. Filed Nov. 13, 1963, Ser. No. 323,238
The portion of the term of the patent subsequent to Jan. 18, 1982, has been disclaimed
19 Claims. (Cl. 260—93.7)

This invention relates to the polymerization and copolymerization of mono- and di-olefins such as ethylene, propylene, butene-1, styrene, isoprene and butadiene and includes within its scope novel catalysts and catalyst components for such polymerization reactions.

Accordingly, it is a principal object of the present invention to provide new and useful catalyst components.

It is another object of the present invention to provide novel polymerization catalysts.

It is still another object of the present invention to provide a novel polymerization process.

Other objects of the present invention will in part be obvious and will in part appear hereinafter.

In accordance with the present invention, mono- and di-olefins are polymerized or copolymerized by catalysts comprising (a) the product of the reaction carried out under certain conditions between certain esters of Group IVa, Va or VIa metals and a nonporous, finely-divided inorganic solid having surface hydroxyl groups thereon, and (b) an organo-metallic compound. The polymerization or copolymerization reaction can be effected at suitable temperatures within the range of from about —25° C. to about 250° C., and pressures ranging from below atmospheric upwardly to any desired maximum pressure, for example, 30,000 p.s.i.g. or even higher pressures.

Inorganic solids suitable for the purposes of the present invention generally include any substantially nonporous (i.e. less than about 25% and preferably less than about 10% of the total surface area being represented by internal surface area) finely-divided solid having an average particle diameter of less than about 0.1 micron and having between about $5 \times 10^{-4}$ and about $4 \times 10^{-3}$ equivalents per gram of hydroxyl groups on the surface thereof, and which, excepting the hydroxyl groups, is substantially inert. For example, certain metal oxides such as nonporous titania, zirconia, thoria, magnesia and silica, and carbon blacks such as channel black are all generally suitable.

It is pointed out that it has been disclosed, for instance in Belgium Patent No. 358,563, to Giulio Natta et al. that Group IVa, Va or VIa metal esters can be absorbed on solid supports which supports can then be contacted with a Group II or III metal alkyl compound to form catalysts suitable for the polymerization of vinyl monomers. Said patent is, however, directed towards the use of silica, alumina and combinations thereof of the type commonly utilized as supports for catalytic cracking processes. Silica and alumina supports of that type are inherently porous in nature, as is demonstrated by the fact that surface area measurements of said supports by electron microscopic examination and by nitrogen absorption techniques are widely divergent. The nonporous finely-divided inorganic solids of the present invention, however, which exhibit relatively little divergence in surface area when measurements by the above-mentioned techniques are compared are remarkably more effective, i.e. in terms of the grams of polymer producible per gram of catalyst employed than the catalysts disclosed in said Belgium patent.

It should be noted, however, that, generally speaking, the ultimate activity and efficiency of the catalyst components produced according to the present invention are also largely dependent upon the accomplishment of an actual chemical reaction of controlled extent between the hydroxyl groups on the surface of the finely-divided solids and said metal esters. Also, it should be kept in mind that, all other factors being equal, the smaller the average particle size of the solid and the larger the quantity of hydroxyl groups on the exterior surface thereof, the greater will be the potential activity and efficiency of the resulting catalyst component producible therefrom. Therefore, it is important to use as the starting material substantially nonporous, finely-divided solids having an average particle diameter of less than about 0.1 micron, and preferably less than about 0.05 micron, and a hydroxyl group content on the surface thereof of between about $5 \times 10^{-4}$ and about $4 \times 10^{-3}$ equivalents per gram. Accordingly, pyrogenic metal or metalloid oxides produced by the vapor phase oxidation or hydrolysis of a corresponding metal or metalloid compound are greatly preferred because they are generally substantially nonporous, are available in average particle diameters of less than about 0.1 micron, and have at least about 50% of the maximum number of hydroxyl groups theoretically possible on the exterior surface thereof.

Transition metal esters suitable for the purposes of the present invention generally include those compounds conforming to the formula $$T(Q)_n$$

where T is a metal chosen from the group consisting of Groups IVa, Va and VIa (where the group numbers correspond to the Mendeleev Periodic System); each Q is chosen from the group consisting of alkoxy and aryloxy radicals comprising 1 to 8 carbon atoms and $n$ is a number from 1 to 6.

Specific examples of Q groups for substitution in the above formula include methoxy ($CH_3O$—); butoxy ($C_4H_9O$—); isopropoxy (i—$C_3H_7O$); allyloxy $$(C_3H_5O—)$$

s-amyloxy (s—$C_5H_{11}O$—); cyclopentyloxy ($C_5H_9O$—); tolyloxy ($CH_3C_6H_4O$—); hexyloxy ($C_6H_{13}O$—); ethyloxy ($C_2H_5O$—); and the like.

Specific examples of compounds conforming to the formula $$T(Q)_n$$

which are suitable for the purposes of the present invention are: tetra-i-propoxy titanium—(i—$C_3H_7O$)Ti$_4$; methoxy i-propoxy dibutoxy titanium—

$$(i—C_3H_7O)CH_3OTi(OC_4H_9)_2$$

tripropoxy butoxy titanium—($C_3H_7O$)$_3$TiOC$_4$H$_9$; tetra-t-butoxy titanium—(t—$C_4H_9O$)$_4$Ti; tetracyclopentyloxy titanium—($C_5H_9O$)$_4$Ti; tetradiethyl-α-ethoxy zirconium —[$CH_3(C_2H_5)_2CO$]$_4$Zr; tetrabutoxy zirconium—

$$(C_4H_9O)_4Zr;$$

tetramethoxy vanadium—($CH_3O$)$_4$V; tetrabutoxy chromium—($C_4H_9O$)$_4$CR; hexamyloxy tungsten—($C_5H_{11}O$)$_6$W; and the like.

In addition to transition metal esters strictly conforming to the above formula, esters wherein other groups have been substituted for some of the alkoxy or aryloxy groups, can be utilized in accordance with the present invention so long as said other groups do not interfere with the reaction of the remaining alkoxy or aryloxy radicals with the hydroxyl groups on the surface of the nonporous solid.

The conditions under which reaction between the transition metal esters and the finely-divided nonporous inorganic solids of the present invention can be accomplished are subject to considerable variation. However, in order to obtain a catalyst component with a high order of activity and reproducible character and performance, it is normally necessary that the inorganic solid be essentially dry and anhydrous (i.e. free of molecular water in any form) at the time it is brought into contact with the transition metal ester. If the nonporous finely-divided solid to be utilized contains molecular water in any form and/or tends to adsorb same on exposure to humid atmospheres, etc., it must be dried immediately before use, or after drying must be maintained continuously out of contact with water vapor until utilized. If the precaution of using a substantially anhydrous finely-divided solid is not observed, the desired chemical reaction either does not occur at all or does not predominate to the extent necessary to produce a superior catalyst component. Instead, products are obtained which are either totally inactive as catalyst components or are very inferior as catalyst components, in that (a) less polymer per gram of catalyst is produced and (b) monomer conversion rates for production of polymer are lower.

Generally, the desired reaction can be carried out by contacting the nonoporous solid with a transition metal ester, preferably a solution thereof in an inert hydrocarbon medium, and maintaining the two reactants in intimate contact, while removing the by-product alcohol, for a period of time sufficient to effect the desired chemical reaction resulting in the chemical bonding of the transition metal ester to the finely-divided solid. It is believed, although there is no intent to be bound by this explanation, that the following illustrative equations correctly demonstrate the desired reactions in which silica represents the finely-divided solid and tetrabutoxy titanium represents the transition metal ester:

*Equation 1*

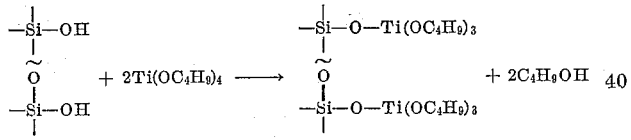

*Equation 2*

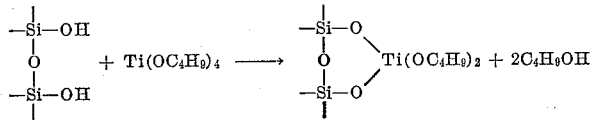

The length of time required to effect a given amount of said reaction is dependent upon the temperature of the reaction mixture and the rate of removal of the by-product alcohol. Generally speaking, any temperature between about 0° C. and about 300° C., can be used satisfactorily, but room temperature or higher will generally be used. Assuming provision is made for intimate contact of the dry, nonporous, finely-divided solid and the transition metal ester, and the by-product alcohol is removed from the reaction zone, the time required to accomplish the chemical reaction needed will vary from periods of the order of 20 minutes at temperatures of about 200° C. or higher, to periods of the order of 4 hours at temperatures of about 10–20° C. Temperatures substantially higher than about 300° C., e.g. 500° C., are completely needless; hence are of little or no interest.

Although use of the transition metal ester in solution form gives excellent results, reaction of said compound with the finely-divided solid can also be effected if the latter is exposed to sufficient quantities of the vapors of a transition metal ester under conditions of time and temperature similar to those discussed above. Said vapors can be supplied under their own vapor pressures using a partial vacuum if necessary, or with the aid of a dry, inert carrier gas such as nitrogen. This vapor phase treatment can be accomplished in any suitable manner such as by circulating the vapors through the particulate solid in a fixed or moving bed reactor.

Any organometallic compound which is capable of reducing the transition metal on the surface of the surface-reacted solids described heretofore is suitable for use as the other component of the finished polymerization catalyst of the present invention. Particularly suitable are the compounds chosen from the group consisting of (a) Compounds conforming to the impirical formula $$MM'_vX_nR_y$$

wherein M is a metal chosen from Groups I, II and III of the periodic table; M' is a metal of Group I of the periodic table; $v$ is a number from 0 to 1; each X is any halogen; $y$ is a number from 1 to 4; each R is chosen from the group consisting of any monovalent hydrocarbon radical and hydrogen; and (b) Compounds conforming to the empirical formula $$R'_pH_mSO_{\frac{4-(m+p)}{2}}$$

wherein each R' is chosen from the group consisting of any monovalent hydrocarbon radical, alkoxy radical, aryloxy radical, and the halogens; $p$ is a number from 0 to 3; each H is a hydride radical; $m$ is a number from 1 to 4; S is a quadrivalent metal of Group IVb, i.e. silicon, germanium, tin or lead; and O is oxygen.

Specific examples of R' groups for substitution in the above formula include methyl; 2-methyl-2-butenyl; n-dodecyl; 4-cyclohexylethyl; methylnaphthylethyl; 2,2,1-bicycloheptyl; tolyl; xylyl; xenyl; methoxy; isobutoxy; n-octyloxy; phenoxy and 1,2-naphthoxy.

Specific examples of compounds conforming to the formula $$R'_pH_mSO_{\frac{4-(m+p)}{2}}$$

which are suitable for the purposes of the present invention are:

silane—$SiH_4$;
ethylsilane—$H_3SiC_2H_5$;
diethylmonochlorosilane—$HSiCl(C_2H_5)_2$;
dichlorosilane—$H_2SiCl_2$;
methyldiethylsilane—$HSi(C_2H_5)_2CH_3$;
trimethoxysilane—$HSi(OCH_3)_3$;
tribenzylsilane—$HSi(CH_2C_6H_5)_3$;
triphenoxysilane—$HSi(OC_6H_5)_3$;
triphenylgermane—$(C_6H_5)_3GeH$;
tricyclohexylgermane—$(C_6H_{11})_3GeH$;
tribenzylgermane—$(C_6H_5CH_2)_3GeH$;
ethylisoamylgermane—$(C_2H_5)(C_5H_{11})GeH_2$;
dibutylstannane—$(C_4H_9)_2SnH_2$;
diisopropylstannane—$(C_3H_7)_2SnH_2$;
tripentylstannane—$(C_5H_{11})_3SnH$;
n-butylgermane—$C_4H_9GeH_3$;
triphenylplumbane—$(C_6H_5)_3PbH$;
triethoxystannane—$(C_2H_5O)_3SnH$ and the like;
cyclic alkyl hydrogen silicones such as $(CH_3HSiO)_6$; and
the linear alkyl hydrogen silicones such as
$(CH_3)_2HSiOSiH(CH_3)_2$.

Organometallic compounds which conform to the formula $$MM'_vX_nR_y$$

and which are suitable for the practice of the present invention include compounds conforming to the subgeneric formula $$M(R)_k$$

wherein M is a Group I, II or III metal, such as sodium, beryllium, boron, aluminum and gallium; wherein $k$ is a number from 1 to 3, depending upon the valency of M; and wherein each R can be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula $$MM'_vX_nR_y$$

and which are therefore suitable for the purposes of the present invention are organometallic compounds such as butyllithium, di-p-tolylmercury, tri-n-armylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula $$MM'_vX_nR_y$$

can be found in U.S. application, Ser. No. 278,414, of Orzechowski and MacKenzie, filed May 6, 1963, now abandoned.

It is pointed out that catalysts formed wtih certain organometallic compounds such as the silanes and germanes require activation by heating, in the case of the silanes normally to temperatures above about 100° C. and preferably above about 130° C. for at least about 1 hour. At higher temperatures, shorter periods of times are required. At substantially lower temperatures, the catalyst is either not formed at all or is of inferior quality.

Although it is appreciated that when R or R' in the above empirical formulae do not comprise at least one hydrocarbon radical, the resulting compounds cannot normally be termed organometallic compounds, compounds lacking at least one hydrocarbon radical comprises such a relatively small number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above-defined general formulae. In addition, it is pointed out that while, strictly speaking, silicon and germanium are not metals, it is intended, and therefore it should be understood, that for the purposes of the present specification and claims, silicon and germanium are metals and the term organometallic includes within its scope, silicon and germanium compounds within the scope of the formula $$R'_pH_mSO_{\frac{4-(m+p)}{2}}$$

Using the catalysts of this invention the polymerization and copolymerization can often be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable.

The proportion of the surface reacted particulate inorganic solid to organometallic compound utilized in preparing the catalyst is not usually a critical feature of the process. I have found from experience that a molar ratio of from about 1 to 10 millimoles of the organometallic compound permilliatom of transition metal chemically combined to the surface of the finely-divided solid is sufficient.

The quantity of catalyst, i.e. comprising both the surface-reacted finely-divided solid and the organometallic compound, to be utilized in the polymerization reaction may vary, but in general, the total quantity of catalyst that need be employed based on the weight of the charging stock is small when nonporous, very fine particle size oxides are utilized as the inorganic solid.

The contact time or space velocity employed in the polymerization process will be selected with reference to the other process variable such as the particular catalysts utilized, the specific type of product desired, and the extent of monomer conversion desired in any given run or pass over the catalyst. In general, this variable is readily adjustable to obtain the desired results.

There follow a number of illustrative non-limiting examples:

*Example 1*

To a 2000 milliliter, three neck, glass reaction vessel equipped with a stirrer and a condenser there is added 40 grams of a silica-alumina mixture, SM-55-9638, produced by Davidson Chemical Division of W. R. Grace and Company, comprising 87% by weight of alumina and 13% by weight of silica, having a BET surface area of about 500 m.²/gram, a surface hydroxyl group concentration of about 0.85 milliequivalent per gram and which had been ground to a screen analysis of <32 and >100. The surface area of said silica-alumina calculated from the average particle size would be about 0.005 m.²/gram. To said reaction vessel there is added 1650 milliliters of toluene and the resulting slurry is dried by being heated to, and maintained at, the boiling point of toluene, i.e. about 11° C., for about 20 hours while a water/toluene azeotrope is periodically distilled from said vessel until about 450 milliliters of distillate has been removed. The vessel is then cooled and charged with 20 millimoles of tetraisopropoxy titanium. The resulting slurry is then maintained at about refluxing temperature for about 8 hours with continuous stirring while the isopropanol produced is continuously removed by azeotropic distillation of about 200 milliliters of distillate. Subsequently, the extent of the reaction between the tetraisopropoxy titanium and hydroxyl groups of the alumina-silica is determined by measuring the quantity of isopropanol that was produced and by testing the liquid contents of the vessel for the absence therein of tetraisopropoxy titanium and the said alumina-silica is found to have 20 milliatoms of titanium chemically bound to the surface thereof. There is then transferred from this reaction vessel to a 1000 milliliter, stainless steel, stirred autoclave which has been previously flushed with dry nitrogen, 100 milliliters of said isopropanol-free slurry containing about 2 milliatoms of titanium bound to the surface of about 4 grams of alumina-silica. Next, 10 millimoles of triisobutylaluminum previously dissolved in about 400 milliliters of anhydrous toluene is charged to said autoclave and the autoclave is then pressurized to 200 p.s.i.g. with ethylene. The autoclave is then continuously agitated and heated to and maintained at about 80° C. for about 8 hours while the pressure therein is maintained at about 200 p.s.i.g. by the intermittent introduction of additional ethylene. The reaction products are analyzed and it is found that about 3 grams of solid polyethylene has been produced.

*Example 2*

This example is essentially a duplicate of Example 1, with the exception that a nonporous pyrogenic silica is utilized instead of said porous silica-alumina.

There is charged into a 2000 milliliter reaction vessel 20 grams of "Cab-O-Sil," a substantially nonporous, pyrogenic silica produced by Cabot Corporation, having an average BET surface area of about 325 m.$^2$/gram and a surface area calculated from the average diameter obtained by electron microscope examination of about 310 m.$^2$/gram, a hydroxyl group concentration of about 1.5 milliequivalents per gram and an average particle diameter of about 10 millimicrons. There is then added to the reaction vessel 1650 milliliters of toluene and the resulting slurry is dried azeotropically by periodic distillation for 20 hours until the remaining slurry comprises a volume of about 1200 milliliters. Next, without exposure to the atmosphere, there is charged to said slurry 20 millimoles of tetraisopropoxy titanium and the resulting mixture is refluxed for about 8 hours while the isopropanol produced is removed by azeotropic distillation as set forth in Example 1. The extent of the reaction between the hydroxyl groups on the surface of the silica and the tetraisopropoxy titanium is determined as set forth in Example 1 and said silica is found to have 20 milliatoms of titanium chemically bound to the surface thereof. There is then transferred to the autoclave utilized in Example 1, 100 milliliters of said slurry containing 2 milliatoms of titanium bound to the surface of 2 grams of silica. Subsequently, polymerization of ethylene is accomplished as set forth in Example 1 and it is found that about 80 grams of polyethylene is produced.

*Example 3*

To a 2000 milliliter, three neck, glass reaction vessel there is added 25 grams of "Alon," a pyrogenic, substantially nonporous, alumina produced by Deutsche Gold- und Silber-Scheideanstalt Vormals Roessler, and which has an average particle diameter of about 10–40 millimicrons, a hydroxyl group content on the surface thereof of about 0.7 milliequivalent per gram and an average surface area as determined by either the BET method or by calculation from the average diameter of about 90 m.$^2$/gm. Said reaction vessel is then placed in a vacuum drying oven heated to a temperature of about 110° C. for about 15 hours. Subsequently, the vessel is sealed without exposing said alumina to the atmosphere and there is charged to said vessel 10 millimoles of tetrabutoxy zirconium and 1200 milliliters of anhydrous toluene. The resulting slurry is then refluxed at the boiling point of toluene with continuous stirring for about 10 hours, while the butanol produced is removed by the azeotropic distillation of 200 milliliters of distillate. Subsequently, the extent of the reaction between the tetrabutoxy zirconium and hydroxyl groups on the surface of the alumina is determined by measuring the quantity of butanol produced and by testing the liquid contents of the vessel for the absence therein of tetrabutoxy zirconium, and the said alumina is found to have 10 milliatoms of zirconium chemically combined on the surface thereof. Next, 200 milliliters of the butanol-free slurry containing about 2 milliatoms of zirconium bound to the surface of about 5 grams of alumina is transferred from this reaction vessel to a 500 milliliter reaction bomb which has been previously flushed with dry nitrogen. Next, 10 millimoles of triphenylaluminum is added to said bomb followed by 50 millimoles of styrene monomer and 200 millimoles of 1,3-butadiene. Said bomb is sealed, then heated to and maintained at about 80° C. for about 6 hours with continuous agitation. Subsequently, the reaction products are analyzed and it is found that a butadiene-styrene copolymer has been produced.

*Example 4*

To a 2000 milliliter, three neck, glass reaction vessel equipped with a stirrer, a condenser and nitrogen inlet and outlet tubes, there is added 10 grams of "Cab-O-Sil" and 1000 milliliters of n-octane. The resulting slurry is then dried azeotropically for about 12 hours until about 300 milliliters of distillate has been removed. Next, the vessel is cooled to ambient temperature and charged with 10 millimoles of tetraethoxy vanadium. The resulting slurry is then refluxed at about 125.7° C. for about 6 hours with continuous stirring while the ethanol produced is continuously removed by the azeotropic distillation of about 200 milliliters of distillate. Subsequently, the extent of the reaction between the tetraethoxy vanadium and the hydroxyl groups on the silica is determined by measuring the quantity of ethanol that was produced and by testing the liquid contents of the vessel for the absence therein of tetraethoxy vanadium, and the said silica is found to have 10 milliatoms of vanadium chemically bound to the surface thereof. 50 milliliters of this slurry containing about 1 milliatom of vanadium bound to the surface of about 1 gram of silica is then transferred, without exposure to the atmosphere, to a 500 milliliter, stainless steel, reaction bomb. There is then charged to said bomb 150 milliliters of anhydrous n-octane and 6 millimoles of triphenylstannane. The bomb is then sealed, heated to 80° C., and agitated for 2 hours. Next, said bomb is pressurized to 600 p.s.i.g. with ethylene and is thereafter maintained at 600 p.s.i.g. for about 8 hours by the periodic introduction of additional ethylene. The reaction products are analyzed and it is found that polyethylene has been produced.

The polymers produced by the catalysts of the present invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silica, extenders, plasticizers, pigments, insecticides, fungicides, etc., can be incorporated into the polymers.

Obviously, many changes can be made in the above-described examples and procedures without departing from the scope of the invention. For example, pyrogenically coformed, metal oxides, or metal oxides coformed with, or mixed with, other compounds are suitable for the purposes of the present invention.

Accordingly, it is intended that the above disclosure be regarded as illustrative in nature and as in no way limiting the scope of the invention.

What we claim is:

1. A catalyst component comprising a substantially nonporous finely-divided inorganic solid having an average particle diameter of less than about 0.1 micron and carrying in chemical combination between about $5 \times 10^{-4}$ and $4 \times 10^{-3}$ equivalents per gram of surface structures chosen from the group consisting of

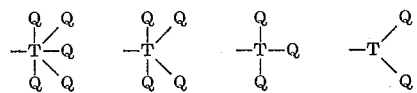

wherein T is a metal chosen from the group consisting of the metals of Groups IVa, Va and VIa (Mendeleev Periodic System); each Q is chosen from the group consisting of alkoxy and aryloxy radicals comprising 1 to 8 carbon atoms; and wherein said structures are chemically linked directly from T to at least one oxygen atom in the surface of said solid.

2. The catalyst component of claim 1 wherein said surface structures comprise

3. The catalyst component of claim 1 wherein said surface structures comprise:

4. The catalyst component of claim 1 wherein said surface structures comprise:

5. The catalyst component of claim 1 wherein the substantially nonporous finely-divided inorganic solid is a metal oxide having an average particle diameter of less than about 0.05 micron.

6. The catalyst component of claim 5 wherein said metal oxide is chosen from the group consisting of silica and alumina.

7. A catalyst comprising the product of reaction between
 (a) a substantially nonporous inorganic solid having an average particle diameter of less than about 0.1 micron and carrying in chemical combination between about $5 \times 10^{-4}$ and $4 \times 10^{-3}$ equivalents per gram of surface structures chosen from the group consisting of

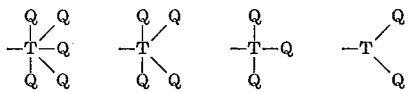

wherein T is a metal chosen from the group consisting of the metals of Groups IVa, Va, and VIa; each Q is chosen from the group consisting of alkoxy and aryloxy radicals comprising 1 to 8 carbon atoms; and wherein said structures are chemically linked from T to at least one oxygen atom in the surface of said solid and
 (b) an organometallic reducing compound.

8. The catalyst of claim 7 wherein the organometallic reducing compound conforms to the formula $$MM'_vX_nR_y$$

wherein M is a metal of Groups I, II and III of the periodic table; M' is a metal of Group I; $v$ is a number from 0 to 1; each X is any halogen; each R is chosen from the group consiting of any monovalent hydrocarbon radical and hydrogen; and $y$ is a number from 1 to 4.

9. The catalyst of claim 8 wherein the organometallic reducing compound conforming to the formula $$MM'_vX_nR_y$$

is an aluminum alkyl.

10. The catalyst of claim 7 wherein the organometallic reducing compound conforms to the formula

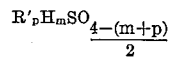

wherein each R′ is chosen from the group consisting of any monovalent hydrocarbon radical, monovalent alkoxy radical, monovalent aryloxy radical, and the halogens; $p$ is a number from 0 to 3; each H is a hydride radical; $m$ is a number from 1 to 4; S is a metal of Group IVb; and O is oxygen.

11. The catalyst of claim 10 wherein the organometallic reducing compound is a silane.

12. The catalyst of claim 10 wherein the organometallic reducing compound is a stannane.

13. A process for polymerizing a substance chosen from the group consisting of a mono-olefin, mixtures of mono-olefins, a di-olefin, mixtures of di-olefins and mixtures thereof which comprises contacting said substance at temperatures between about −25° C. and 250° C., with a catalyst comprising
 (a) a substantially nonporous, finely-divided inorganic solid having an average particle diameter of less than about 0.1 micron and carrying in chemical combination between about $5 \times 10^{-4}$ and $4 \times 10^{-3}$ equivalents per gram of surface structures chosen from the group consisting of

wherein T is a metal chosen from the group consisting of the metals of Groups IVa, Va and VIa; each Q is chosen from the group consisting of alkoxy aryloxy radicals comprising 1 to 8 carbon atoms; and wherein said structures are chemically linked directly from T to at least one oxygen atom in the surface of said solid, and
 (b) an organometallic reducing compound.

14. The process of claim 13 wherein the substance to be polymerized is an α-mono-olefin.

15. The process of claim 13 wherein the substance to be polymerized is a di-olefin which has a double bond in the alpha position.

16. The process of claim 13 wherein said organometallic reducing compound is an aluminum alkyl.

17. The process of claim 13 wherein said organometallic reducing compound is a trialkylsilane.

18. The process of claim 13 wherein said organometallic reducing compound is a trialkylstannane.

19. The process of claim 13 wherein said inorganic solid has an average particle diameter of less than about 0.05 micron.

References Cited
UNITED STATES PATENTS 3,073,811  1/1963  Natta et al. _____ 260—93.7
3,166,542  1/1965  Orzechowski et al. ___ 260—94.9

JOSEPH L. SCHOFER, *Primary Examiner.*

L. EDELMAN, *Assistant Examiner.*